Patented Dec. 14, 1948

2,456,085

UNITED STATES PATENT OFFICE 2,456,085

CATION-EXCHANGE RESINS PREPARED BY CONDENSING SULFOPHTHALIC ANHYDRIDE AND XYLENE

Stanley P. Rowland, Philadelphia, Pa., assignor to Rohm & Haas Company, Philadelphia, Pa., a corporation of Delaware No Drawing. Application March 21, 1946, Serial No. 656,156

4 Claims. (Cl. 260—78.4)

1

This invention relates to resinous compositions which are insoluble in aqueous solutions of acids, bases, and salts and which are particularly suitable for sorbing cations from fluids. More specifically, this invention concerns the preparation and use of cation-exchange resinous compositions which comprise the insoluble and infusible reaction products of xylene and sulfophthalic anhydride.

The resins of this invention are prepared by reacting xylene with sulfophthalic anhydride to form a resinous gel or jelly-like mass which is then dried and heated to yield a hard, insoluble and infusible, porous resinous product.

In the preferred process, sulfophthalic anhydride and xylene are mixed and heated in the ratio of at least two mols of xylene per mol of anhydride. While the mechanism of the reaction is not thoroughly understood, the facts remain that water is split off and the sulfophthalic anhydride and xylene apparently condense in somewhat the same way as in the formation of a phthalein from a phenol and phthalic anhydride. Ultimately, the reaction mixture is converted to a gel. It is preferred to have present an excess of xylene over the amount which reacts in order to facilitate gel formation. Any reasonable excess may be used and satisfactory results are obtained when an excess of 1 to 5 mols is employed. This gelation can and will take place in the reaction vessel; but it is more convenient to transfer the reaction mixture to shallow trays prior to gel formation and then allow the formation of the gel to take place in the tray. When a gel is formed, the entire reaction mixture has the appearance of a uniform, jelly-like mass. The gel is heated and dried, excess xylene is removed, and the product is obtained as a hard, infusible, insoluble, sponge-like mass which may be readily broken into particles of the proper size for use in treating fluids.

As prepared above, the resins are in the acidic or hydrogen form and are capable of exchanging the acidic hydrogen atoms for other cations. When the resin is in the acid—or hydrogen—form and is contacted with fluids containing cations such as sodium, calcium, magnesium, and iron, the cations are adsorbed by the resin and the acidic hydrogen ions thereof are liberated. Subsequently, the resin may be regenerated or reconverted to the hydrogen form by being washed with dilute mineral acid.

Alternatively, the resin as prepared above may be neutralized with a solution of a base such as sodium hydroxide and thus be converted into a salt. This salt in turn will exchange its cations for other cations present in fluids brought in contact with the resin. For example, when the acidic resin is neutralized with sodium hydroxide,

2 the sodium salt is formed. This salt, like the acidic resin, is capable of exchanging cations and the sodium may be replaced by the cations, such as calcium ions, present in a fluid contacting the resin. Subsequently, the resin may be regenerated to the sodium form by being washed with a solution of sodium chloride.

The ability of the resin to be used repeatedly for cation-adsorption and to be regenerated repeatedly is an important advantage. Furthermore, the resins of this invention have high capacity; that is, they are capable of sorbing large quantities of cations per unit of weight. This high capacity is due to the chemical composition of the resins and also to their porous structure, which results from their having passed through the gel stage while being made. These resins may also be used in conjunction with inert materials; and they may be prepared in the presence of carriers, extenders, or fillers such as silica, alumina, starch, wood-flour, etc.

The following example illustrates a process of making a product of this invention.

Into a three-necked flask equipped with thermometer, mechanical stirrer, reflux condenser, and water separator was poured a solution of one mol of sulfophthalic anhydride dissolved in three mols of xylene. The solution was heated to refluxing temperature and was maintained at this temperature for two and one-half hours during which time water was continuously removed. At the end of this time the solution gelled. The gel was transferred to trays which were heated in an oven at 150° C. for two hours. The product was a black, brittle, insoluble, infusible, porous, sponge-like mass. It was broken and screened to a mesh size of −20 to +40. When placed in a one-inch, vertical, ion-exchange column and tested for cation-adsorbing properties, it was found to have a capacity of 3.17 milliequivalents of sodium carbonate per gram of resin. It was capable of repeated use and regeneration.

I claim:

1. An insoluble, infusible, porous, resinous composition having cation-exchange properties, which comprises a condensate of one mol of sulfophthalic anhydride, having the formula

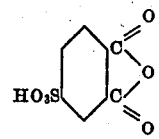

and two mols of xylene.

2. A process for preparing insoluble, porous, resinous compositions suitable for the sorption of cations from fluids, which comprises reacting by condensing under the influence of heat one mol of sulfophthalic anhydride, having the formula

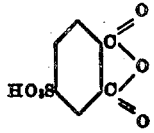

and two mols of xylene, continuing said condensation until a gel is formed, and drying and heating said gel until it is converted into a porous mass of insoluble, infusible, acidic resin.

3. A process for preparing insoluble, porous, resinous compositions suitable for the sorption of cations from fluids, which comprises reacting by condensing under the influence of heat one mol of sulfophthalic anhydride, having the formula

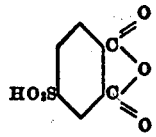

and two mols of xylene, continuing said condensation until a gel is formed, drying and heating said gel until it is converted into a porous mass of insoluble, infusible, acidic resin, and neutralizing said acidic resin by means of a solution of an inorganic base.

4. A process for preparing insoluble, porous, resinous compositions suitable for the sorption of cations from fluids, which comprises reacting by condensing under the influence of heat one mol of sulfophthalic anhydride, having the formula

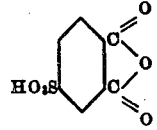

and two mols of xylene, containing said condensation until a gel is formed, drying and heating said gel until it is converted into a porous mass of insoluble, infusible, acidic resin, and neutralizing said acidic resin by means of a solution of sodium hydroxide.

STANLEY P. ROWLAND.

REFERENCES CITED

The following references are of record in the file of this patent:

UNITED STATES PATENTS

| Number | Name | Date |
|---|---|---|
| 2,204,539 | Wassenegger et al. | June 11, 1940 |